Patented May 27, 1952

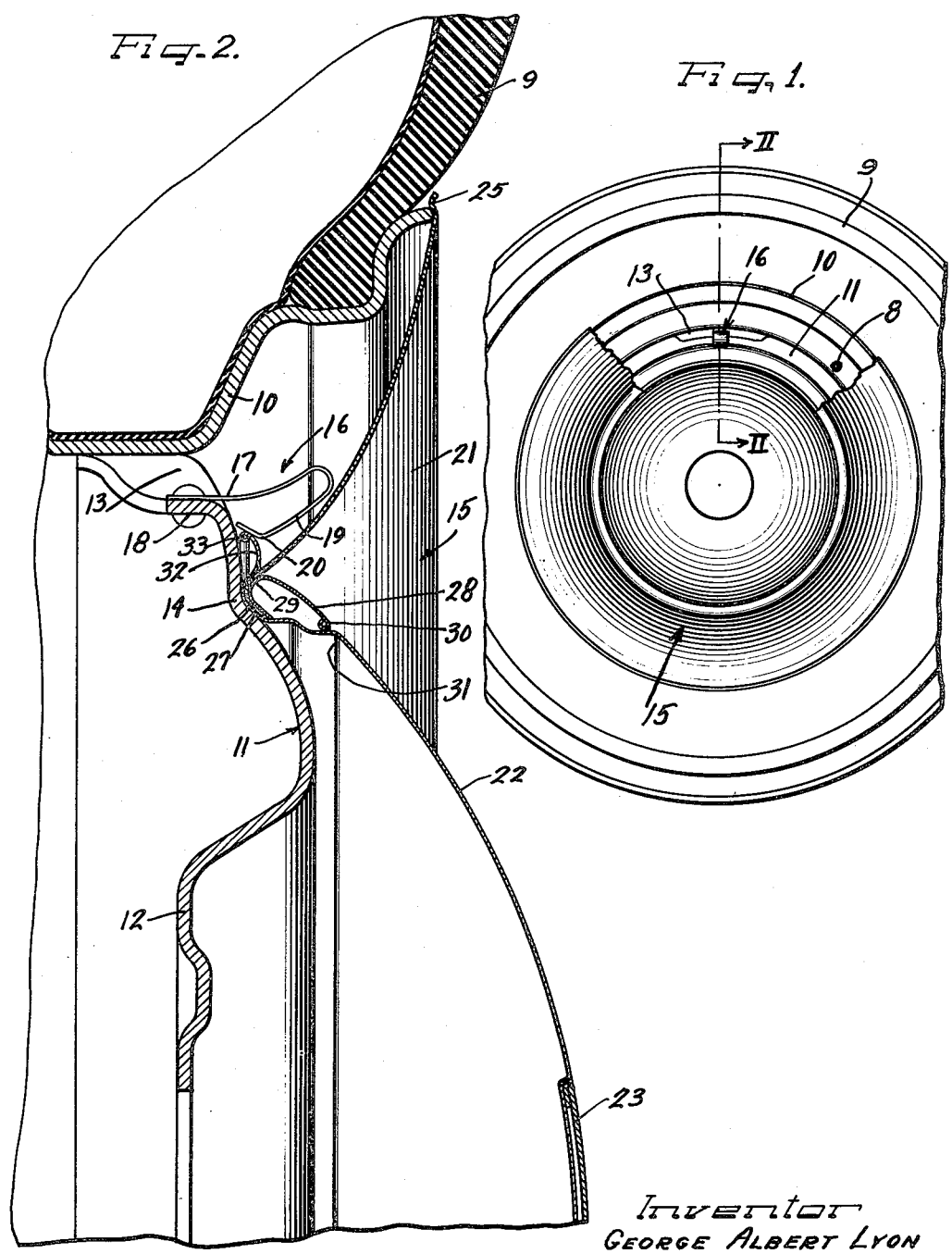

2,597,880

UNITED STATES PATENT OFFICE 2,597,880

WHEEL COVER

George Albert Lyon, Allenhurst, N. J.

Application December 22, 1945, Serial No. 636,873

10 Claims. (Cl. 301—37)

This invention relates to a wheel structure, and more particularly to a multi-part cover assembly for an automobile wheel.

An object of this invention is to provide an improved but simple structure for detachably retaining a cover on an outer side of an automobile wheel.

Another object of this invention is to provide a composite plastic and metal cover assembly of simple construction and which may be easily applied to or removed from an automobile wheel.

Still another object of the invention is to provide a multi-part cover assembly in which an outer part is made of plastic and a central one of metal, the two parts being reinforced at their junction and the reinforcement being extended for retaining cooperation with spring means on a wheel.

In accordance with the general features of this invention, there is provided in a cover structure for a wheel, including a tire rim and a body part having spaced spring clips projecting therefrom, a wheel cover assembly including a central cover member having an annular recess therein and an outer cover ring having a turned inner margin nested and retained in the recess. The outer periphery of the central member projects radially beyond the recess and behind the ring for snap-on retaining engagement with the clips.

Another feature of the invention relates to the forming of the outer ring of plastic and a central member of metal, and to the reinforcement of their nested junction by a snap-on bead of such a construction that it may be nested in the recess to clamp the inner edge of the plastic ring to the metal central member.

Another feature of the invention relates to the forming of the aforesaid outer periphery of the central member so that it will serve as a backing for the clamped inner margin of the bead, and at the same time, provide an annular reinforced concealed flange for cam-like engagement with the free extremities of the spring clips.

Still another feature of the invention relates to the formation of the wheel body in the aforesaid wheel construction so as to provide a shoulder on which the junction of the cover parts can bottom in close proximity to the inwardly facing free extremities of spring clips fastened to the body part radially beyond the shoulder.

Other objects and features of this invention will more fully appear from the following detailed description taken in connection with the accompanying drawings which illustrate several embodiments thereof, and in which Figure 1 is a fragmentary side elevation of the wheel structure, embodying the features of this invention and partially broken away to show the manner in which one of the spring clips extends out of one of the openings in the wheel body; and Figure 2 is an enlarged fragmentary cross-sectional view, taken on substantially the line II—II of Figure 1, looking in the direction indicated by the arrows.

As shown on the drawings:

The reference character 9 designates generally a conventional pneumatic tire and tube assembly positioned in a conventional multi-flanged drop center type of tire rim 10 which constitutes one element of the wheel.

The tire assembly 9 may have the customary valve stem 8 (Figure 1) projecting outwardly through one of the side flanges of the tire rim 10.

The tire rim is suitably secured to and carried by a central load-bearing or body part 11, which is dished at the center 12 for detachable securement in the usual way to a part on the axle of an automobile. Any suitable means, such, for example, as cap screws or bolts (not shown) may be employed for this purpose.

The outer margin of the body part 11 at spaced intervals is notched to provide wheel openings 13, which serve the dual purpose of providing for the circulation of air through the body part and around the usual brake drum (not shown), and also for causing the body part 11 to, in appearance, simulate a spoked member or spider.

An intermediate portion of the body part is indented to provide an annular shoulder 14 against which the cover assembly of my invention, designated generally by the reference character 15 is adapted to bottom when on the wheel.

Positioned in each of the openings 13, which may be of any suitable number, such, for example as three to five, is an axially extending spring clip 16. This clip is of the so-called "inverted" type, and has one leg 17 secured as by means of rivets 18 to the body part in the wheel opening. The other leg 19 is turned back upon the leg 17 and is formed with an angular free extremity 20 adapted to have a cam-like engagement with a portion of the cover assembly 15 for detachably holding the cover assembly on the wheel. It will be noted that the free extremity 20 of each of the clips 16 faces the axis of the wheel and is disposed in relatively close proximity to the shoulder 14 in the body part.

The cover assembly 15 includes an outer annular plastic ring 21 and a central circular metal cover member 22. The central cover member may be crowned as illustrated so as to simulate a hub cap, and may, if it is so desired, be provided with a central medallion or emblem plate 23 suitably held or formed in the center of the member 22.

This central cover member 22 may be made in the form of a stamping from any suitable sheet metal, such, for example, as stainless steel, 18.8 steel, and the like.

The bowed annular ring 21 may be made from any suitable thermoplastic material, such, for example, as ethyl cellulose, cellulose acetate or vinyl resins. The plastic material that is used should be of a type that is resiliently yieldable without permanent distortion. In other words, upon flexure of any portion of the ring, that portion, upon being released, will spring back to its original contour.

For illustration, the outer edge 25 of the ring can be manually engaged and pulled axially away from the wheel for the purpose of affording access to the rear side of the ring 21. This feature is necessary where it is desired to adjust the conventional balancing weights (not shown) on the wheel flanges, or where it is necessary to get to the valve stem for attaching a hose nozzle thereto without the necessity of removing the cover from the wheel.

The outer edge 25 of the ring 21 is slightly turned so as to overhang an outer edge of the tire rim in close proximity to the side wall of the tire assembly 9. The ring extends axially and radially inwardly from the edge 25 to the shoulder 14 of the body part where the inner margin of the ring is turned in a generally divergent direction from the normal direction of the main portion of the ring. This turned portion 26 is nested in an annular recessed portion 27 formed in an outer margin of the central member 22.

In other words, the turned inner edge of the ring is formed complementary to the cross-sectional configuration of the recessed portion of the cover member 22 so as to tightly nest therein. In order to assist in holding this turned edge against the central member, I provide an annular hollow metal bead 28 having a turned outer margin 29 for pressing the inner margin of the plastic ring 21 tightly against the recessed portion of the central member 22.

The inner edge 30 of the hollow bead 28 is adapted to bottom on and engage a shoulder 31 formed in the member 22. This arrangement is such that after the inner edge 27 of the plastic ring has been seated or nested in the recessed portion 22, the bead 28 can be readily snapped into position in the recess for clamping the ring to the member 22. This provides for reinforcement of the ring 21 and member 22 at their junction, and precludes damage to the inner turned margin of the ring.

In addition, if the bead 28 is made so as to have a lustrous external finish, it will enable desirable contrasting color effects. For example, the ring 21 may have a white external finish, in which event it will appear to constitute a white side wall extension of the wall of the tire thereby giving an illusion of the tire extending clear down to the bead 28. The exposed portion of the cover part 22 can be given any suitable color finish to match the body of the vehicle, or it can be finished in black, if it is so desired. Thus a cover assembly is provided in which a tire ring 21 is set off from a dark central member 22 by an intermediate lustrous bead 28.

The outer periphery of the central member 22, in accordance with the features of this invention, is formed into a continuous dished flange 32, the edge 33 of which is of a diameter so as to retainingly engage the free extremities 20 of the spring clips 16. The diameter of this edge 33 is such that when the cover is in engagement with the spring clips, the free extremities 20 of the clips are slightly deflected radially outwardly whereby they are caused to resiliently urge the peripheral flange 32 of the cover member 22 toward the body member, thus holding the cover assembly 15 tightly against the shoulder 14 with the outer edge 25 of the ring 21 bearing against the edge of the rim.

It should be noted that the dished flange 32, by reason of its location and configuration, serves to form a backing against which the inner turned margin of the plastic ring 21 is clamped by the snap-on metal bead 28.

In applying the cover assembly 15 to the wheel, it is placed over an outer side of the wheel and is then pressed axially toward the body part 11 until the concealed edge 33 is snapped over and behind the high points of the angular extremities 20 of the spring clips 16.

The spring clips, by reason of their being of the inverted type, as well as on account of the angular shape of the extremities 20 enable what is sometimes called an "easy on and a hard off" action with reference to the cover.

In order to remove the cover, the operator pulls the edge 25 of the plastic ring slightly away from the wheel and inserts a pry-off tool, or screw driver, behind the ring 21 so as to engage the normally concealed edge 33. Then by a slight leverage or twisting action the entire cover assembly can be forcibly ejected from its retaining engagement by the spring clips.

The clips in use are located directly behind the bowed outer ring 21 in close proximity thereto although sufficient clearance is provided for the flexing of the clips at the rear of ring 21.

The present application is a continuation-in-part of my copending application Serial No. 603,661, filed July 7, 1945 now Patent Number 2,544,699, issued March 13, 1951.

I claim as my invention:

1. In a cover structure for a wheel, including a tire rim and a body part having circumferentially spaced spring clips projecting therefrom, a wheel cover assembly including a central circular cover member for disposition on the body part and having an annular recess therein, an outer annular cover ring for disposition opposite the tire rim and having a turned inner margin nested and retained in said recess, the outer periphery of said central member projecting radially beyond said recess and behind said ring for snap-on retaining engagement by said clips, and a retaining annular bead snapped into said recess for clamping the inner margin of the cover ring to the central member.

2. In a cover structure for a wheel, including a tire rim and a body part, a wheel cover assembly including a central circular cover member for disposition on the body part and having an annular recess therein, an outer annular cover ring for disposition opposite the tire rim and having a turned inner margin nested and retained in said recess, the outer periphery of said central member projecting radially beyond said recess and behind said ring for retaining engagement with means on the wheel, and a retaining annular bead snapped into said recess for clamping the inner margin of a cover ring therein.

3. In combination in a cover of the character described, a central circular hub-cap-like member having an annularly grooved margin extending generally radially outwardly, a ring member having the radially inner margin thereof extending generally radially inwardly and seating within said groove, and a retaining annulus clamping said inner margin in said groove.

4. In a cover assembly for a wheel structure, a hub cap member, a trim ring member having its radially inner margin in engagement with the hub cap member, and an ornamental bead clamping the inner margin of the trim ring member to the hub cap member.

5. In a cover assembly for a wheel structure, a hub cap member, a trim ring member having its radially inner margin in engagement with the hub cap member, and an ornamental bead clamping the inner margin of the trim ring member to the hub cap member, said hub cap member having its margin extending radially outwardly behind the trim ring member for attachment to the wheel with which the cover is associated.

6. In a cover assembly for a vehicle wheel, an inner circular member having radially spaced annular shoulders adjacent its margin, an annular cover member having its radially inner margin in engagement with said circular member adjacent to the radially outermost of said shoulders, and a retaining and ornamental bead having its margins formed to engage retainingly with said respective shoulders and clamping said inner margin of the annular cover member against the circular cover member by means of the radially outer margin of the bead.

7. In combination, a vehicle wheel having a tire rim and a load sustaining body part including an annular groove therein adjacent to the tire rim, a circular cover member including an annular rib adapted to seat in said groove and affording a generally axially outwardly opening groove, an annular trim ring member for covering the tire rim and having its inner margin turned generally radially inwardly and axially outwardly and seated in the groove of said circular cover member, and a retaining bead clamping said margin of the trim ring in said groove of the circular cover member.

8. In a cover structure for a wheel including tire rim and body portions, a circular hub-cap-like member engageable with the body portion, an annular member adapted to lie in concealing relation to the tire rim and having a radially inner margin engaging said hub-cap-like member, and an annular member carried by said hub-cap-like member and clamping said margin of the first mentioned annular member in assembly with the hub-cap-like member.

9. In a wheel structure including a tire rim and a wheel body having openings adjacent to the juncture with the tire rim, cover-retaining clips disposed at said openings and projecting outwardly therefrom, said wheel body having an annular outwardly opening groove adjacent to said openings and disposed radially inwardly from said clips, a circular wheel body covering cover member having an axially inwardly projecting annular marginal rib seating in said groove and including a beaded edge retainingly engaged by said clips, said rib defining an axially outwardly opening groove, and a tire rim covering annulus having its margin secured in said marginal rib groove.

10. In a wheel cover of the character described, a trim ring portion having a generally radially inwardly and axially outwardly extending inner marginal divergent flange on a rib-like juncture facing generally axially inwardly, a member retainingly supporting the trim ring and having a pair of annular outwardly protruding ribs defining an outwardly opening groove therebetween receptive of said juncture rib on the trim ring, and means for retaining said flange in assembly with the retaining member with said rib-like juncture seated in said groove.

GEORGE ALBERT LYON.

REFERENCES CITED

The following references are of record in the file of this patent:

UNITED STATES PATENTS

| Number | Name | Date |
| --- | --- | --- |
| D. 141,494 | Lyon | June 5, 1945 |
| 2,304,584 | Lyon | Dec. 8, 1942 |
| 2,308,617 | Lyon | Jan. 19, 1943 |
| 2,317,393 | Lyon | Apr. 27, 1943 |
| 2,368,254 | Lyon | Jan. 30, 1945 |